(12) United States Patent
Crivello

(10) Patent No.: US 9,185,840 B2
(45) Date of Patent: Nov. 17, 2015

(54) PORTABLE DIRECT CURRENT HYDROSEEDER

(71) Applicant: Anthony Michael Crivello, Winchester, CA (US)

(72) Inventor: Anthony Michael Crivello, Winchester, CA (US)

(73) Assignee: Anthony Michael Crivello, Winchester, CA (US)

( * ) Notice: Subject to any disclaimer, the term of this patent is extended or adjusted under 35 U.S.C. 154(b) by 0 days.

(21) Appl. No.: 13/921,508

(22) Filed: Jun. 19, 2013

(65) Prior Publication Data

US 2014/0061325 A1    Mar. 6, 2014

Related U.S. Application Data

(60) Provisional application No. 61/697,132, filed on Sep. 5, 2012.

(51) Int. Cl.
*A01C 7/06* (2006.01)
*A01C 7/00* (2006.01)

(52) U.S. Cl.
CPC .. *A01C 7/06* (2013.01); *A01C 7/004* (2013.01)

(58) Field of Classification Search
CPC .................................. A01C 7/06; A01C 7/004
USPC ........................................... 111/7.1, 7.3, 127
See application file for complete search history.

(56) References Cited

U.S. PATENT DOCUMENTS

| | | | | |
|---|---|---|---|---|
| 2,878,617 A * | 3/1959 | Finn | ............................ | 47/1.01 R |
| 2,740,230 A * | 4/1959 | Clapper | ........................ | 239/654 |
| 3,717,285 A * | 2/1973 | Hatton | ............................ | 222/136 |
| 4,387,852 A * | 6/1983 | Mattson et al. | ................ | 239/143 |
| 4,483,486 A * | 11/1984 | Magda | ............................ | 239/663 |
| 4,723,710 A * | 2/1988 | Lucore, II | ..................... | 239/124 |
| 4,865,255 A * | 9/1989 | Luvisotto | ...................... | 239/149 |
| 4,913,356 A * | 4/1990 | Gunlock | ......................... | 239/317 |
| 5,050,340 A * | 9/1991 | Seifert | ........................... | 47/48.5 |
| 5,050,995 A * | 9/1991 | Lucore, II | ..................... | 366/136 |
| 5,287,994 A * | 2/1994 | Dempsey | ....................... | 222/158 |
| 5,361,711 A * | 11/1994 | Beyerl | ........................... | 111/127 |
| 5,884,570 A * | 3/1999 | Lincoln | .......................... | 111/130 |
| 6,029,853 A * | 2/2000 | Kubo et al. | ....................... | 222/1 |
| 6,070,814 A * | 6/2000 | Deitesfeld | ...................... | 239/654 |

* cited by examiner

*Primary Examiner* — Jamie L McGowan

(57) ABSTRACT

A portable hydroseeding system comprising a housing for containing a slurry, a propellant means connected to the housing and an outlet control mechanism for distributing the slurry.

8 Claims, 2 Drawing Sheets

PORTABLE DIRECT CURRENT HYDROSEEDER

CROSS REFERENCE TO RELATED APPLICATION

The present application claims priority from U.S. Provisional Patent Application No. 61/697,132, filed Sep. 5, 2012, entitled "Solar Powered Hydroseeder/Fertilizer Machine", the contents of which are incorporated herein by reference in their entirety.

FIELD

The invention pertains to hydro-seeding and more specifically a hydroseeding system that is economical, efficient, portable and environmentally friendly.

BACKGROUND

Hydroseeding (or hydraulic mulch seeding, hydro-mulching, hydraseeding) is a planting process that uses a slurry of water, seed, mulch and fertilizer. The slurry is transported in a housing, either truck-mounted or trailer-mounted and sprayed over prepared ground in a uniform layer. Alternatively, helicopters and aircraft can be used where larger areas must be covered, such as, for example, burned wilderness areas after a fire. Hydroseeding is an alternative to the traditional process of broadcasting or sowing dry seed and promotes quick germination and inhibits soil erosion. Hydroseeding is used to seed grass on residential and commercial sites (highways/motorways etc.), golf courses, lawns and areas too large, inaccessible or unsuitable for conventional methods. Starting a lawn by hydroseeding is considerably cheaper than laying sod/turf and quicker than dry seed. It is also used to spread mixtures of wildflower and tree/shrub seeds or turf grasses for erosion control. Hydroseeding typically has similar costs to dry seeding techniques that combine seed and straw mulch. Further, the hydroseeding slurry is weed free whereas straw mulch can contain weeds. Also, hydroseeding is less than ¼ the cost of laying sod/turf.

Disadvantageously, there has never been a portable hydroseeder due to the pressure required to eject the mulch. As described in U.S. Pat. No. 3,717,285, hydroseeding is currently done by hiring a contractor that has a truck with separate housings for the water and dry ingredients (mulch, seed, fertilizer and water etc.) and an agitator pump to mix the water and dry ingredients to produce a slurry that can be spread over a large area. U.S. Pat. No. 4,913,356 describes a portable seeding device that uses suction, using the venturi effect, to lift a mixture of water and seed from a jar. The constriction required to lift the seed and water out of the jar using the venturi effect is insufficient to allow mulch and fertilizer to be added to the jar. Additionally, the amount of seed, mulch, fertilizer and water required to cover at least one square foot area would make the jar extremely large and unwieldy.

Therefore, there is a need for a hydroseeder that is economical, efficient, portable and environmentally friendly that overcomes the problems of the prior art.

SUMMARY

The problems of the prior art have been successfully overcome by the present invention, which is directed to a portable hydroseeding method. The system comprises a portable housing means for containing a slurry, a propellant means connected to the housing and outlet control means for distributing a slurry. The propellant means can be a direct current battery powering a direct current pump/motor connection or a direct current battery charged by a solar panel(s) or solar cell(s) which in turn powers the direct current pump/motor connection. Preferably, the propellant connection is a direct current motor/pump battery connection (solar optional).

The housing may hold all of the parts needed to complete the steps needed to comprise a direct current portable hydroseeder that is economical, efficient and affordable, but it may also be noted that some or all of the portable hydroseeder's parts may be mounted to a cart, wagon or hand truck etc. The housing further comprises an threaded cap/lid, a agitation/return jet valve circuit, an output valve direct current pump(s)/motor(s) circuit, in another embodiment a booster agitation pump/motor for agitating a slurry, a booster pump/motor for boosting and distributing a slurry, an output nozzle valve for controlling the output of the slurry to the earth, a return circulation circuit for the agitation pump/motor, a direct current output motor/pump for slurry distribution and or agitation, a vacuum slurry pickup hose inside of the tank, an optional dual vacuum slurry pickup for circulation and mixing of the slurry, an electric switch or if multiple pump/motors are used switches, a direct current battery to power the motor(s)/pump(s), a solar panel or solar cell to charge the direct current battery and a solar panel charge controller to maintain the proper charge in the direct current battery. The housing, control valves and water and slurry jets may be constructed from wood, plastic, aluminum, steel, fiberglass, carbon fiber, polyethylene, resin, vinyl, PVC and glass, but preferably from stainless steel.

There is a method for using the direct current portable hydroseeding system comprising of the of: a) removing thatch and or dead vegetation from one or more than one areas to be seeded; b) loosening the soil from one or more than one areas to be seeded; c) placing the hydroseeder proximate to one or more than one areas to be seeded; d) fill the hydroseeder ½ with water; e) prime hose(s) and pump(s) with water; f) adding dry ingredients to the hydroseeder; g) turn on hydroseeder to form a slurry; h) opening the outlet control valve; i) applying the slurry to the loosened earth until the housing becomes free of seed; and j) repeating steps c through i until all areas are seeded.

DRAWINGS

These and other features, aspects and advantages of the present invention will become better understood with regard to the following description, appended claims, and accompanying figure where:

DETAILED DESCRIPTION

The present invention solves the problems with the prior art by providing a hydroseeder that is economically feasible for an individual to own or rent, and is efficient because in one embodiment the Portable Direct Current (DC) Hydroseeder/

Fertilizer Machine may be solar powered, making it environmentally friendly. In another embodiment one may convert a typical Direct Current (DC) spot sprayer over to a Hydroseeder/Fertilizer Machine (Non-Solar Powered Spot Sprayer) so that one machine may spray herbicides and pesticides, fertilizers, hydromulch and seeds. The Portable Direct Current (DC) Hydroseeder/Fertilizer Machine is portable so that the individual user can use the Direct Current (DC) Hydroseeder/Fertilizer Machine anywhere at any time without the need to hire a commercial contractor with a massive hydroseeding vehicle as required by the prior art. Additionally, a portable cart or wheeled hydroseeder, which anyone can use to propagate a slurry of seed, mulch, water and fertilizer. The Portable Direct Current (DC) Hydroseeder/Fertilizer Machine is lightweight, compact, reusable and can be easily stored. The Portable Direct Current (DC) Hydroseeder/Fertilizer Machine described herein has the capabilities of a large commercial hydroseeder, with compact portable convenience.

As used in this disclosure, except where the context requires otherwise, the term "comprise" and variations of the term, such as "comprising", "comprises" and "comprised" are not intended to exclude other additives, components, integers or steps.

The term "slurry" refers to a mixture of water, seed and mulch with other additives, such as fertilizer, coloring agent and weed killer or premade mixtures, such as, for example, Scotts® Patchmaster® products among others.

The term "portable" refers to a device that can be transported from one location to location by no more than two persons and preferably only one person.

In the following description, specific details are given to provide a thorough understanding of the embodiments. However, it will be understood by one of ordinary skill in the art that the embodiments can be practiced without these specific details. For example, circuits can be shown in block diagrams in order not to obscure the embodiments in unnecessary detail.

Also, it is noted that the embodiments can be described as a process that is depicted as a flowchart, a flow diagram, a structure diagram, or a block diagram. Although a flowchart can describe the operations as a sequential process, many of the operations can be performed in parallel or concurrently. In addition, the order of the operations can be rearranged. A process is terminated when its operations are completed.

Figure 1A:
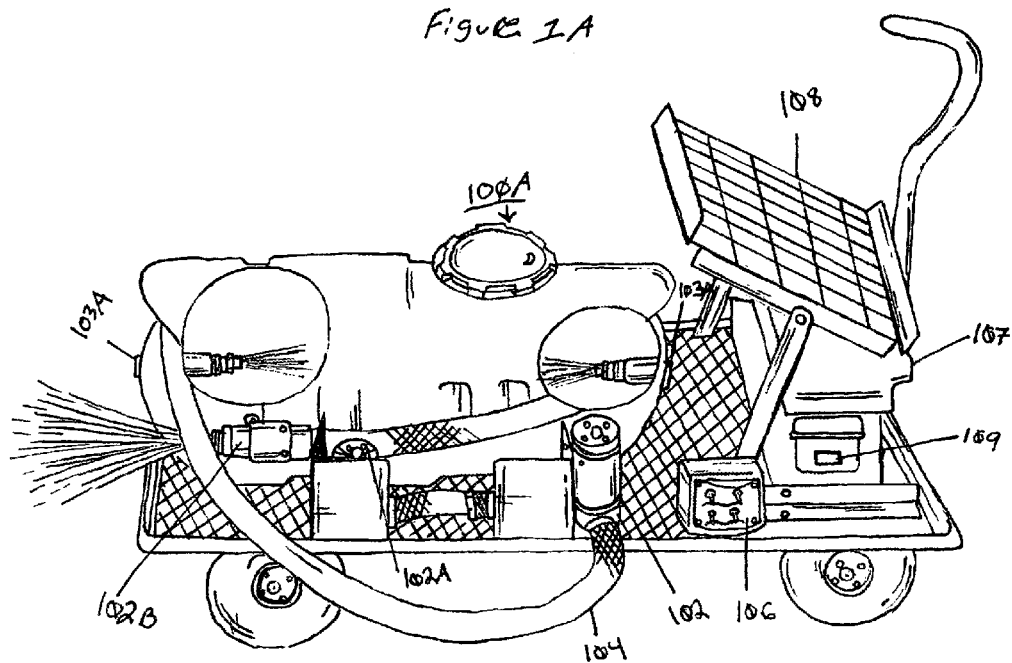
FIG. 1A is a schematic diagram of a cart mounted solar powered direct current hydroseeding system that is economical, portable, efficient and environmentally friendly according to one embodiment of the present invention.

As can be seen in FIG. 1A, there is a diagram of a cart mounted Solar Powered Hydroseeder/Fertilizer System 100A that is economical, efficient, environmentally friendly, portable according to one embodiment of the present invention. The portable hydroseeding system 100A comprises a slurry output hose 104 attachment connected to a slurry control valve 102B. One skilled in the art may appreciate, unscrew threaded cap of the Solar DC (direct current) Hydroseeder 100A, please note the cap/lid of the hydroseeding system as well as the hydroseeding machine itself may be constructed of wood, plastic, resin, polyethylene, aluminum, steel, plastic, carbon fiber, vinyl, glass, fiberglass or stainless steel. A cart containing a Solar Powered Hydroseeding System which contains a tank for holding a slurry of water, seed, mulch and fertilizer 100A. A hydroseeder 100A tank which contains a slurry mixing/recirculation jets 103 and optionally 103A, mixing/recirculation pump 10/A. An output control pump 112 for distributing a slurry onto the earth, optionally a second booster pump 102A may be used to boost output pressure of pump 104. A solar panel 108 for charging the battery 10'7. A solar charge controller 109 maintains the proper voltage from solar panel 108 to insure that the direct current battery 107 maintains the proper voltage. An electrical switch(s) 106 for controlling the current of the DC (direct current) agitating/recirculation 101A and slurry discharge pump(s) 102 and 102A. A slurry vacuum intake port 105A (not shown) of solar powered hydroseeder 100A for distributing a slurry through agitating/recirculation pump(s) 105A through mixing/recirculation jet(s) 103 and 103A through the DC (direct current) output pump(s) 104 to the output slurry hose nozzle 102B to the earth.

Figure 1B:
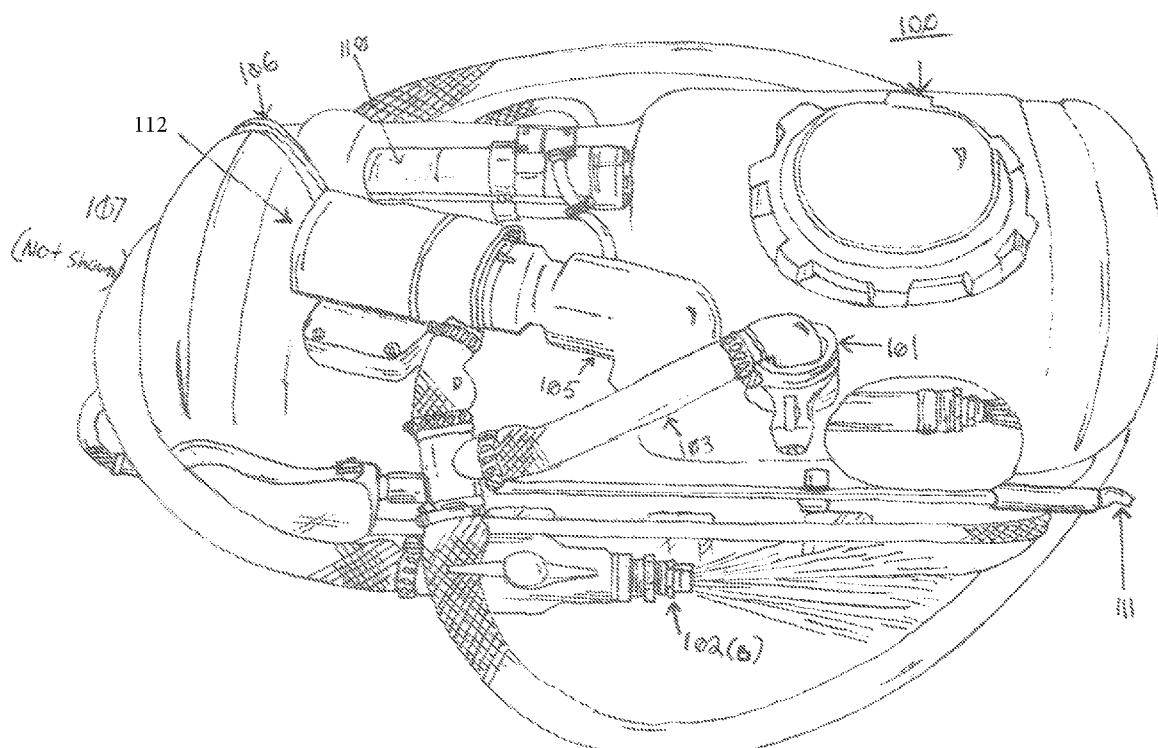
FIG. 1B is a schematic diagram of a typical direct current spot or broadcast sprayer converted over to spray hydroseeding slurry as well as herbicides, pesticides, making the sprayer versatile, compact, portable and efficient, according to another embodiment of the present invention.

FIG. 1B shows a schematic diagram of spot sprayer conversion kit DC (direct current) hydroseeding system 100 that is economical, efficient and portable according to another embodiment of the present invention. In this embodiment the elements of the hydroseeder described in FIG. 1A are identical with the exception of the solar means 108, the solar charge controller 109. Please note that the spot sprayers that currently exist in the world today maybe converted over relatively easily by a person skilled in the art. A person skilled in the art may convert a spot sprayer over to a hydroseeder (FIG. 1B) for spraying a slurry of water, seed, mulch and fertilizer, herbicides, pesticides making one relatively small, efficient, portable, low cost sprayer that any person with the means may own or rent. Please note in FIG. 1B that the existing pump 110 and spray wand 111 are still in place for utilization.

Referring now to FIG. 1B, The process of converting over a typical spot sprayer to a DC (direct current) hydroseeding conversion kit system for the typical homeowner, landscaper, pet owner, golf coarse maintenance person or plant nursery person. Place the existing pump 110 from vertical to horizontal, please note the pump head should be pointing to the threaded cap 100. (drill holes as necessary to mount pump 110). Position pump 104 proximate to vacuum slurry pickup 105 (so the hole may be drilled) for the vacuum slurry pickup 105 to be installed (drill holes as necessary to mount pump, use spacer if needed). Plumb pump 104 using intake slurry hose (inside tank slurry pickup hose) 105. Plumb pump 104 output side with a tee for 103 return line and 101 agitation/return circuit, plumb other end of tee with 102B output nozzle valve for distributing a slurry.

Figure 2:
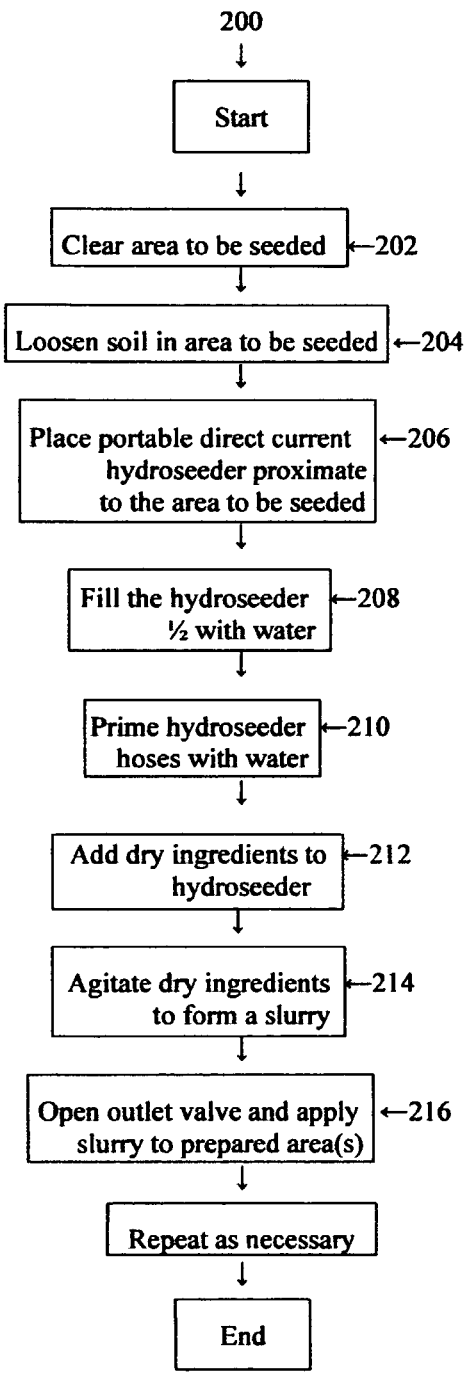
FIG. 2 is a flowchart diagram of some steps of a method for using the hydroseeders shown in FIGS. 1A and 1B.

Referring now to FIG. 2, there is shown some steps in 200 of a method for using the hydroseeder 100 or 100A. First remove thatch and dead vegetation 202 from one or more than one areas to be seeded. Then, soil for one or more than one areas to be seeded, is loosened 204 to provide better seed adhesion. Place portable hydroseeder 100 or 100A proximate to the area to be seeded 206. Fill hydroseeder ½ full with water 208. Prime hydroseeding hose(s) and pump(s) with water 210. Add dry ingredients to hydroseeder (seed, mulch, fertilizer etc.) 212. Turn on switch 106 to agitate dry ingredients to form a slurry 214. Open outlet pump/motor switch/valve 102,102A and 102B apply slurry to prepared area(s) 216. Repeat as necessary.

Although the present invention has been discussed in considerable detail with reference to certain preferred embodiments, other embodiments are possible. Therefore, the scope of the appended claims should not be limited to the description of the preferred embodiments contained in this disclosure. All references cited herein are incorporated by reference in their entirety.

What is claimed is:
1. A portable hydroseeding system comprising:
a) a portable housing for containing a slurry;
b) a propellant connection connected to the housing, where the propellant connection is selected from a group consisting of a direct current motor/pump connection, and a solar powered direct current motor/pump connection;

c) an outlet control mechanism connected to the housing for distributing the slurry;
d) a threaded lid opening portion;
e) an intake agitation/return valve connected to a tee fitting;
f) an output valve connected to the direct current motor/pump;
g) a booster motor/pump connected to the direct current motor/pump for agitation, discharge, or both agitation and discharge of the slurry;
h) an output nozzle connected to a hose for distributing slurry;
i) an intake return circulation hose valve connected to an agitation jet;
j) a slurry distribution/agitation valve connected to the direct current motor/pump;
k) a vacuum slurry intake pickup hose connected to the intake of the direct current motor/pump; and
l) an electrical switch connected to a direct current battery for the direct current motor/pump.

2. The portable hydroseeding system of claim 1, where the propellant connection is a direct current (DC) motor/pump connection.

3. The portable hydroseeding system of claim 1, where the threaded lid opening portion is used for adding dry ingredients of seed, mulch, fertilizer and water.

4. The portable hydroseeding system of claim 3, further comprising:
a) the direct current (DC) battery connected to the direct current pump/motor;
b) the recirculating agitating jet connected to the top of housing portion for spraying the pressurized water, seed, mulch and fertilizer to form a slurry inside the housing;
c) an exit control valve for controlling the discharge of slurry connected to the inside of the housing portion;
d) the direct current (DC) battery is connected to the housing or a cart, wagon or wheeled apparatus, a lawn tractor or ATV which provides voltage and amperage connected to the direct current (DC) motor/pump for providing direct current to the motor;
e) the direct current (DC) motor/pump is connected to the housing and provides centrifugal force, creating a vacuum force for mixing and distributing the slurry of seed, mulch, fertilizer and water; and
f) the output nozzle connected to an output port of the direct current (DC) powered motor for distributing the slurry of seed, mulch, fertilizer and water over an area.

5. The portable hydroseeding system of claim 2, further comprising;
a) the removable threaded lid is used for adding dry ingredients seed, mulch, fertilizer and water to form the slurry in the housing;
b) an output tee connected to the direct current (DC) motor/pump; and
c) the outlet valve being connected to a tee of the output direct current (DC) motor to regulate the distribution of the slurry of seed, mulch, water and fertilizer from the housing.

6. The portable hydroseeding system of claim 5, wherein the housing may contain multiple direct current (DC) pump or pumps and or valves for providing agitation and or discharge fo the slurry of seed, mulch, fertilizer and water.

7. The portable hydroseeding system of claim 1, wherein the propellant connection is a solar powered direct current motor/pump.

8. The portable hydroseeding system of claim 6, where the housing and control valves may be made from a group consisting of plastic, steel, polyethylene, polypropylene, resin, vinyl, carbon fiber, fiberglass, wood, aluminum, glass, brass PVC (polyvinyl chloride), stainless steel and both ferrous and non-ferrous metals.

\* \* \* \* \*